(12) United States Patent
Cookman et al.

(10) Patent No.: US 8,219,872 B2
(45) Date of Patent: Jul. 10, 2012

(54) EXTENDED DEINTERLEAVER FOR AN ITERATIVE DECODER

(75) Inventors: Jordan Christopher Cookman, San Jose, CA (US); Tao Yu, San Jose, CA (US); Ping Dong, Cupertino, CA (US); Junjie Qu, Shanghai (CN)

(73) Assignee: CSR Technology Inc., Sunnyvale, CA (US)

( * ) Notice: Subject to any disclaimer, the term of this patent is extended or adjusted under 35 U.S.C. 154(b) by 860 days.

(21) Appl. No.: 12/340,134

(22) Filed: Dec. 19, 2008

(65) Prior Publication Data

US 2010/0037123 A1    Feb. 11, 2010

Related U.S. Application Data

(63) Continuation-in-part of application No. 11/650,226, filed on Jan. 5, 2007, now Pat. No. 7,853,214.

(60) Provisional application No. 61/104,639, filed on Oct. 10, 2008.

(51) Int. Cl.
*G06F 11/00* (2006.01)
(52) U.S. Cl. .......... 714/752; 714/701; 714/702
(58) Field of Classification Search ........... 714/702, 714/752, 755, 761, 778, 779, 701
See application file for complete search history.

(56) References Cited

U.S. PATENT DOCUMENTS

| | | | |
|---|---|---|---|
| 6,014,761 A * | 1/2000 | Lachish et al. | 714/702 |
| 6,035,034 A | 3/2000 | Trump | |
| 6,249,757 B1 | 6/2001 | Cason | |
| 6,839,870 B2 * | 1/2005 | Fanfelle et al. | 714/702 |
| 7,032,138 B2 | 4/2006 | Cameron | |
| 7,096,403 B2 | 8/2006 | Seki | |
| 7,181,184 B1 | 2/2007 | Dimeo et al. | |
| 7,577,881 B1 * | 8/2009 | Shridhar et al. | 714/702 |
| 2001/0039637 A1 | 11/2001 | Bengough | |
| 2004/0196933 A1 | 10/2004 | Shan et al. | |
| 2006/0268962 A1 | 11/2006 | Cairns et al. | |
| 2009/0204772 A1 * | 8/2009 | Kolze | 711/157 |

OTHER PUBLICATIONS

International Search Report and the Written Opinion issued for PCT/US2009/060144, dated Dec. 10, 2009, 9 pages.

* cited by examiner

*Primary Examiner* — Robert Beausoliel, Jr.
*Assistant Examiner* — Joseph Kudirka
(74) *Attorney, Agent, or Firm* — Fulbright & Jaworski L.L.P.

(57) ABSTRACT

An extended deinterleaver the extended deinterleaver being responsive to at least one input signal, comprised of codewords, and operative to generate a deinterleaved output signal. The extended deinterleaver comprising a storage space organized into B number of appended storage branches, at least one appended storage branch having a storage branch and at least one element N, the received codewords being deinterleaved and buffered by the extended deinterleaver prior to being provided to the variable iteration decoder. Each appended storage branch further having a length that is extended by the length of N, N being at least one element, wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N.

16 Claims, 5 Drawing Sheets

FIG. 2(iii)

EXTENDED DEINTERLEAVER FOR AN ITERATIVE DECODER

CROSS REFERENCE TO RELATED APPLICATIONS

This application claims the benefit of U.S. Provisional Patent Application, entitled "EXTENDED DE-INTERLEAVER FOR AN ITERATIVE DECODER," U.S. Provisional Application No. 61/104,639, filed on Oct. 10, 2008, by Cookman et al., and this application is a continuation-in-part of U.S. patent application Ser. No. 11/650,226, filed on Jan. 5, 2007 and entitled "DYNAMIC MULTI-PATH DETECTION DEVICE AND METHOD" by Dong et al., both of which are incorporated herein by reference as though set forth in full.

FIELD OF THE INVENTION

The present invention relates generally to digital communications and more particularly to an extended deinterleaver used in digital communications.

DESCRIPTION OF THE PRIOR ART

The field of digital communication has grown significantly in the last decade due to recent advantages in wideband communication channels and solid-state electronics. Digital communication describes the transmission of a sequence of digital messages or a digitized analog signal.

Digital communication commonly relies on interleaving the transmitted signal at the transmitter, and deinterleaving the transmitted signal at the receiver. The process of interleaving is commonly used in digital data transmission technology to protect the transmission against burst errors. These errors overwrite a significant amount of bits in a row. As a consequence, a typical error correction scheme that expects errors to be more uniformly distributed can be overwhelmed. Interleaving is used to help prevent this from happening.

Data is commonly transmitted with error control bits that enable the receiver to correct a certain number of errors that occur during transmission. If a burst error occurs, too many errors can be made in one codeword, and that codeword cannot be correctly decoded. To reduce the effect of such burst errors, the bits or symbols of a number of codewords are interleaved before being transmitted. When interleaving is used, a burst error affects only a correctable number of bits in each codeword, and the decoder can decode the codewords correctly.

Interleaving has become a popular method for addressing the problem of burst errors because it is a less complex and cheaper solution when compared to an alternative solution wherein the power of the error correction scheme is directly increased.

Interleavers are often used at the transmitter in a communication system, so that together with a corresponding deinterleaver at the receiver, they help to spread out local variations in the channel conditions more uniformly, so that the overall performance of the system can be improved.

Forward Error Correction (FEC) schemes are often used in communication systems to provide redundancy that can be exploited by receivers to accurately recover data from noisy signals. State of the art FEC schemes often use turbo codes or low-density parity-check (LDPC) codes that can be decoded iteratively in the receiver. For example, the GB20600-2006 standard for digital terrestrial television broadcast in China provides three different LDPC codes. (This standard is also known by the acronym DTMB, for Digital Television Multimedia Broadcast.) Receiver performance typically improves with increased number of decoding iterations supported. A common receiver design problem is how to tradeoff the number of decoding iterations that can be supported with the cost of the receiver.

A conventional receiver includes a codeword buffer before the FEC decoder, so that the performance is limited by the average number instead of the maximum number of decoder iterations required per codeword. Without the codeword buffer, the FEC decoder must process codewords at the same rate as they are received, meaning that the FEC decoder must be able to perform the maximum number of iterations required for the worst-case codeword within the time it takes for one codeword to be received. If there is a codeword buffer, however, the FEC decoder can take longer than one codeword period to process the worst-case codeword. If it takes longer than one codeword period to decode a codeword, then the codeword buffer fills up. If it takes shorter than one codeword period to decode a codeword, then the codeword buffer empties out. As long as the number of iterations per codeword period supported by the FEC decoder is greater than the average number of iterations required per codeword, the buffer will tend to stay empty the majority of the time. The size of the buffer determines how many peak iterations can be supported. For example, if the codeword buffer holds one complete codeword, then the FEC decoder can support a peak iteration number that is twice the number supported in a single codeword period. For example, such an approach is described in "Design and Standardization of Low-Density Parity-Check Codes for Deep-Space Applications", by Andrews et al.

Both the deinterleaver and the codeword buffer require some type of memory in the receiver. In a conventional receiver, the memory for each function may be separate or the two may be shared. If two separate memories are used, then two addressing logic circuits are needed. In a typical shared memory implementation, the deinterleaver and codeword memory accesses must take place in separate memory cycles, reducing the throughput. Alternatively, a dual-port memory must be used, which increases the cost to produce the receiver.

Thus, the need arises for a combined deinterleaver and codeword buffer, which advantageously provides a lower cost solution to maintain the existing throughput levels and reduce the cost of memory required.

BRIEF SUMMARY OF THE INVENTION

Briefly, an extended deinterleaver employed for use with a variable iteration decoder, the extended deinterleaver being responsive to at least one input signal, which is comprised of codewords, and operative to generate a deinterleaved output signal. The extended deinterleaver including a storage space organized into B number of appended storage branches, at least one appended storage branch having a storage branch and at least one element N. The received codewords being deinterleaved and buffered by the extended deinterleaver prior to being provided to the variable iteration decoder, wherein at least one or more of the elements of each branch are output in a first in first out manner, and each appended storage branch further having a length that is extended by the length of N, N being at least one element. Wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N.

The foregoing and other objects, features and advantages of the present invention will be apparent from the following detailed description of the preferred embodiments which make reference to several figures of the drawing.

BRIEF DESCRIPTION OF THE DRAWINGS

FIGS. 2(*i*), 2(*ii*), and 2(*iii*) show examples of the contents of the deinterleaver and codeword buffer for both a conventional deinterleaver and an extended deinterleaver.

DETAILED DESCRIPTION

To overcome the limitations in the prior art described above, and to overcome other limitations that will become apparent upon reading and understanding the present specification, the present invention discloses an extended deinterleaver. The extended deinterleaver includes a combination of a deinterleaver and codeword buffer, or extended deinterleaver, avoiding the need for a dedicated codeword buffer. The extended deinterleaver includes appending N elements to each storage branch (B) in a conventional deinterleaver. This approach effectively buffers N*B elements, where B is the number of storage branches in the extended deinterleaver. Each storage branch is organized in the storage space of the extended deinterleaver. Because the buffer is integrated with the deinterleaver itself, extra read and write operations are unnecessary. The number of read and write operations can affect both the cost and performance of the receiver. Normally only one read or write can be done in a single memory cycle. If there are too many read or write operations, the memory may have to be divided into multiple pieces, each with its own addressing circuit, increasing the cost. Alternatively, dual-port memory may be needed, which is more costly than single-port memory. The performance of the receiver can be negatively affected if the number of memory accesses by the deinterleaver and FEC codeword buffer reduces the memory throughput available to other receiver processes in a shared memory design.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

As will be evident with the figures and description to follow, an extended deinterleaver-decoder is disclosed to include a variable iteration decoder, and is operative to utilize extended deinterleaver branches to provide a buffered output to the variable iteration decoder. Further, the extended deinterleaver is also operative to provide a metric to the variable iterative decoder which indicates how many elements are currently available in the buffer.

Figure 1:
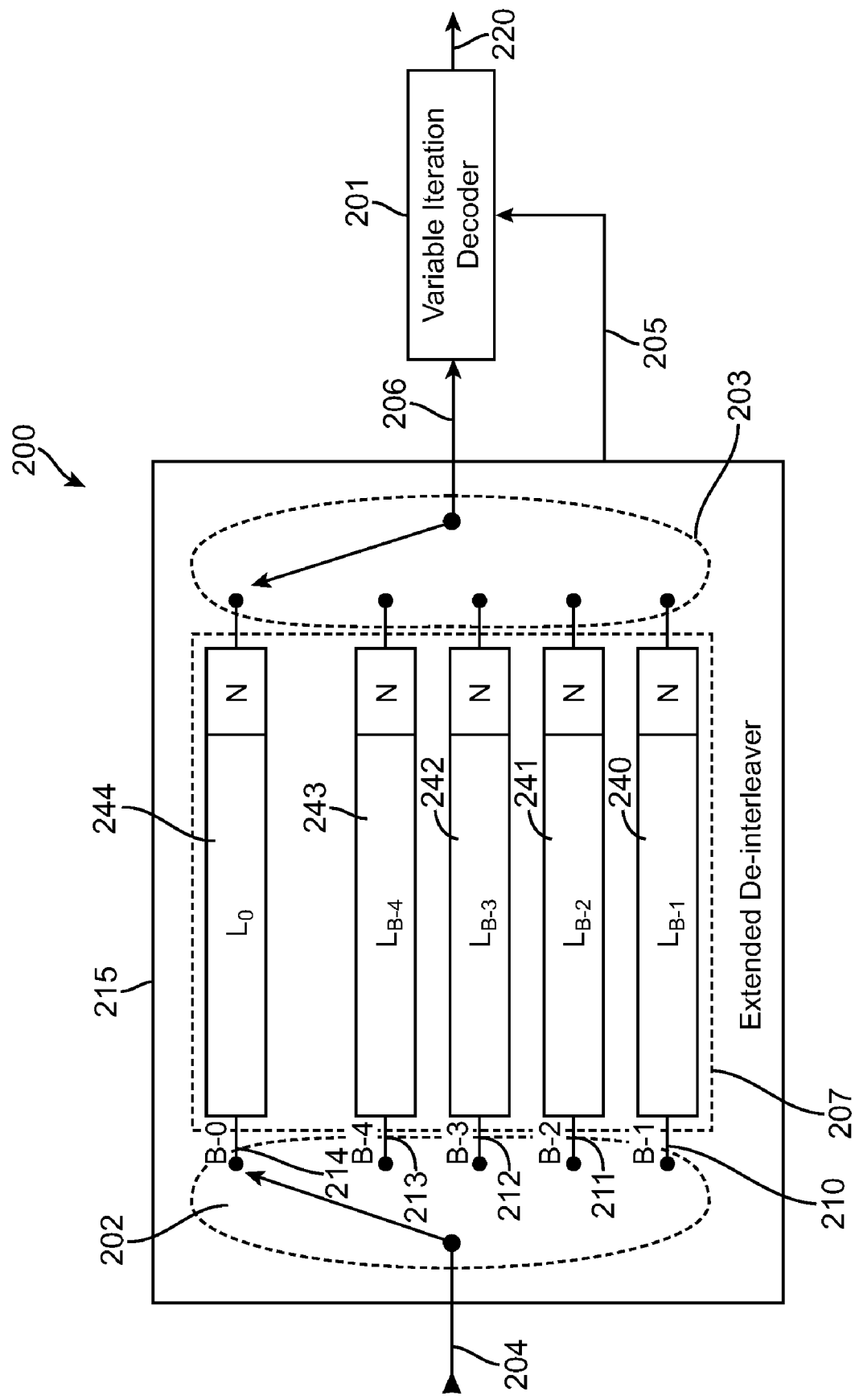
FIG. 1 shows a block diagram of extended deinterleaver-decoder 200, in accordance with an embodiment of the present invention.

FIG. 1 shows a block diagram of an extended deinterleaver-decoder 200, in accordance with an embodiment of the present invention. The extended deinterleaver-decoder 200 is shown to include variable iteration decoder 201 and an extended deinterleaver 215. Extended deinterleaver 215 is shown to include input commutator 202, output commutator 203, deinterleaver input signal 204, metric 205, deinterleaver output signal 206, and storage space 207. The storage space is shown organized into B number of appended storage branches: (B1) appended storage branch 210, (B2) appended storage branch 211, (B3) appended storage branch 212, (B4) appended storage branch 213, or (B=0) appended storage branch 214. At least one appended storage branch 210, 211, 212, 213, or 214 has at least two parts, one of which is a storage branch. Appended storage branch 210 is shown to include storage branch 240, appended storage branch 211 is shown to include storage branch 241, appended storage branch 212 is shown to include 242, appended storage branch 213 is shown to include storage branch 243, and appended storage branch 214 is shown to include storage branch 244. Each appended storage branch 210, 211, 212, 213, and 214 is further shown to include N, with N being at least one element. Note that extended deinterleaver 215 includes B appended storage branches, but appended storage branches 1 through (B-5) are not shown. Any number of storage branches may be employed. Note that one or more storage branches may have length 0, resulting in an appended storage branch with length N.

N is appended to a storage branch to derive an appended storage branch. In this manner, advantageously, a codeword is provided to the variable iteration decoder 201 while one or more codewords are provided to the storage space 207.

In an alternative embodiment of the present invention where branch storage is implemented by random access memory (RAM), input commutator 202 and output commutator 203 are replaced with input logic 202 and output logic 203. Input logic 202 and output logic 203 determine the proper read and write locations in RAM such that the outputs are in the same order they would be if the extended deinterleaver was implemented with separate first-in first-out (FIFO) buffers for each appended storage branch and input/output commutators 202 and 203

An extended storage branch is a collection of elements stored in a first in first out (FIFO) manner. The elements of the extended storage branch could be symbols, bits, or channel state information. In one exemplary embodiment of the present invention, elements are stored in a FIFO buffer constructed of registers. In another exemplary embodiment, elements are stored in RAM, where they are addressed in the same order as if they were in FIFO registers.

In the extended deinterleaver 215 the actual number of appended storage branches is variable, and determined by design and performance considerations known to one skilled in the art.

The extended deinterleaver 215 is shown composed of B appended storage branches: (B1) branch 210, (B2) branch 211, (B3) branch 212, (B4) branch 213, and (B=0) branch 214. Each branch 210, 211, 212, 213, and 214 has its own length $L_b$+N. The lengths $L_b$ correspond to the interleaving operation performed by the transmitter.

Appended storage branch length is determined by the interleaving method used by a corresponding transmitter. Therefore, the deinterleaving method used by the deinterleaver must match the interleaving method used by the transmitter. For example, if the transmitter uses a block interleaving scheme, then each storage branch has equal length. In a block deinterleaver, the commutator at the deinterleaver input advances once per element, and the commutator at the deinterleaver output advances once per group of elements. The block size is determined by the number of elements multiplied by the number of storage branches. The block size determines the maximum length of a burst error that can be tolerated by a subsequent FEC decoder.

In a deinterleaver, the storage branch length $L_b$ corresponds to the length of the interleaver branch in the transmitter. In a convolutional deinterleaver, the storage branch lengths are different for each storage branch. More specifically, in a convolutional deinterleaver the storage branch length $L_b$ corresponds to the length of the interleaver, such that the storage branch length of the interleaver added to the storage branch length of the deinterleaver is equal to a constant. One of the applications of the extended deinterleaver-decoder 200 is in a receiver that is in compliance with the DTMB standard. In the DTMB standard application, the length of interleaver (B=0) branch is zero, so the constant is determined by the length $L_0$ of the extended deinterleaver (B=0) branch 214. In a block interleaver, the storage branch length in the interleaver (in the transmitter) and the storage branch length in the deinterleaver (in the receiver) are equal.

For example, in a Forney type convolutional deinterleaver, the length of each storage branch is $L_b=(B-1-b)*M$. In a typical convolutional deinterleaver, both input and output commutators advance once per element.

FIG. 1 further shows deinterleaver input signal 204. Signal 204 is the transmitted signal sent from the transmitter. It has generally been processed by a signal processing circuit in the receiver, and represents the output of an equalizer. Signal 204 is received by input commutator 202. Input commutator 202 is operative to store the signal 204 in one of the B appended storage branches: (B1) branch 210, (B2) branch 211, (B-3) branch 212, (B4) branch 213, 0 branch 214, or branches 1 through B-5 (not shown.). The order of appended storage branches is determined by the corresponding order used in a transmitter. Each appended storage branch, branches 210, 211, 212, 213, 214, as well as other branches not shown, delays the input signal 204 by a fixed number of elements, determined by $L_b+N$. The length $L_b$ is determined by a corresponding storage branch length in the transmitter, while the extended length N is available to buffer additional FEC codewords in the event that a greater than average number of iterations are required by the FEC decoder.

The choice of N depends on the desired number of peak FEC decoder iterations to support. The average number of iterations available per codeword is $I_{avg}$, which can be determined by dividing the time it takes to receive one codeword by the time it takes to perform one FEC decoder iteration. In order to support a peak number of iterations $I_{peak}=(M+1)*I_{avg}$, M FEC codewords must be buffered, M being a positive integer. If F is the length of the FEC codeword in elements, then N=M*F/B elements must be appended to each of the B storage branches in the deinterleaver. Note that the FEC decoder must be capable of detecting when it has done sufficient iterations to get an error-free output, so that at least some of the FEC codewords take fewer than $I_{avg}$ iterations to decode.

An output commutator 203 is operative to retrieve the stored elements from one of the B appended storage branches, (B1) appended storage branch 210, (B2) appended storage branch 211, (B3) appended storage branch 212, (B4) appended storage branch 213, (B=0) appended storage branch 214, or appended storage branches 1 through B-5 (not shown). The stored elements are representative of input elements delayed by an amount determined by the length of the appended storage branch. The order of appended storage branches is determined by a corresponding order used in a transmitter. It is noted that the order of appended storage branches may or may not be the same order as used by the input commutator 202. The retrieved element is passed by the output commutator 203 as output signal 206 to a variable iteration decoder 201. Through the deinterleaving process, output signal 206 has been re-ordered relative to the input signal 204, so that it is in the same order used at the input to the interleaver in a transmitter. Stated differently, the deinterleaver process applies an inverse permutation to restore the sequence to its original ordering. Decoder 201 is a FEC decoder which uses turbo codes, LDPC codes, or other codes that can be decoded iteratively. In one embodiment of the present invention, decoder 201 uses one of the three different LDPC codes specified by the GB20600-2006 standard for digital terrestrial television broadcast in China. Decoder 201 is operative to generate output signal 220. In one embodiment, decoder 201 includes an operation to convert data symbols into one or more bit soft metrics. Output signal 220 represents the information signal to be decoded. In an alternative embodiment of the present invention, other error correction or error check codes may be performed on the output signal 220 after the variable iteration decoder. For example, in a DTMB receiver, the output signal 220 may go to a Bose Ray-Chaudhuri Hocquenghem (BCH) decoder. In another alternative embodiment of the present invention, the BCH decoder may be integrated with the variable iteration decoder 201 such that BCH decoding is done during each iteration. In yet another embodiment of the present invention, output 220 may be further processed by a descrambler or de-randomizing circuit.

FIG. 1 still further shows metric 205. Metric 205 is sent from extended deinterleaver 215 to decoder 201. Metric 205 indicates how many elements are currently available in the buffer. Metric 205 is passed to the decoder 201 for use in determining when to start and stop decoding a codeword. Generally, decoding can start as soon an entire FEC codeword is available, and decoding should stop when further iterations would cause one or more of the deinterleaver branches to overflow. In one embodiment of the present invention the metric 205 is a count of elements or codewords, and could represent elements currently in the buffer, or empty locations in the buffer.

It is noted that the B appended storage branches (B1) appended storage branch 210, (B2) appended storage branch 211, (B3) appended storage branch 212, (B-4) appended storage branch 213, (B=0) appended storage branch 214, and appended storage branches 1 through B-5 (not shown) of the extended deinterleaver 215 could be implemented as a single memory or portion of a memory, and the commutator function could be implemented as an address generation logic. The key point is that the order of the extended deinterleaver 215's inputs and outputs is equivalent to the case where each appended storage branch is implemented as a separate first in first out (FIFO) buffer, and the input commutator 204 and output commutator 203 select among the B buffers for input and output.

It is further noted that the deinterleaver inputs and outputs are not synchronized. In general, the inputs arrive at a fixed rate determined by earlier stages in the receiver. The output rate is variable, and depends on the availability of the FEC decoder. When the FEC decoder is busy with the previous codeword, the output must stop. When the FEC decoder is available, the output should be as fast as possible. In general, the peak output rate must be higher than the input rate in order to take advantage of the extended buffering.

In summary, the extended deinterleaver 215 receives at least one input signal 204, comprised of codewords, and generates a deinterleaved output signal 206, the extended deinterleaver 215 includes the storage space 207, which is organized into B number of appended storage branches, (B1) through (B=0) (in the embodiment of FIG. 1), at least one appended storage branch having at least two parts of which one is the storage branch and the other is N, N being at least one element. The contents of each appended storage branch is output in a first in first out manner, and each appended storage branch further has a length that is extended by the length of N. A codeword is provided to the variable iteration decoder 201 while other codewords are provided to subsequent appended storage branches, and each appended storage branch is indexed by 'b' and has a length of $L_b$+length of N, wherein $L_b$ is the length of the storage branch prior to appending N.

Figure 2I:
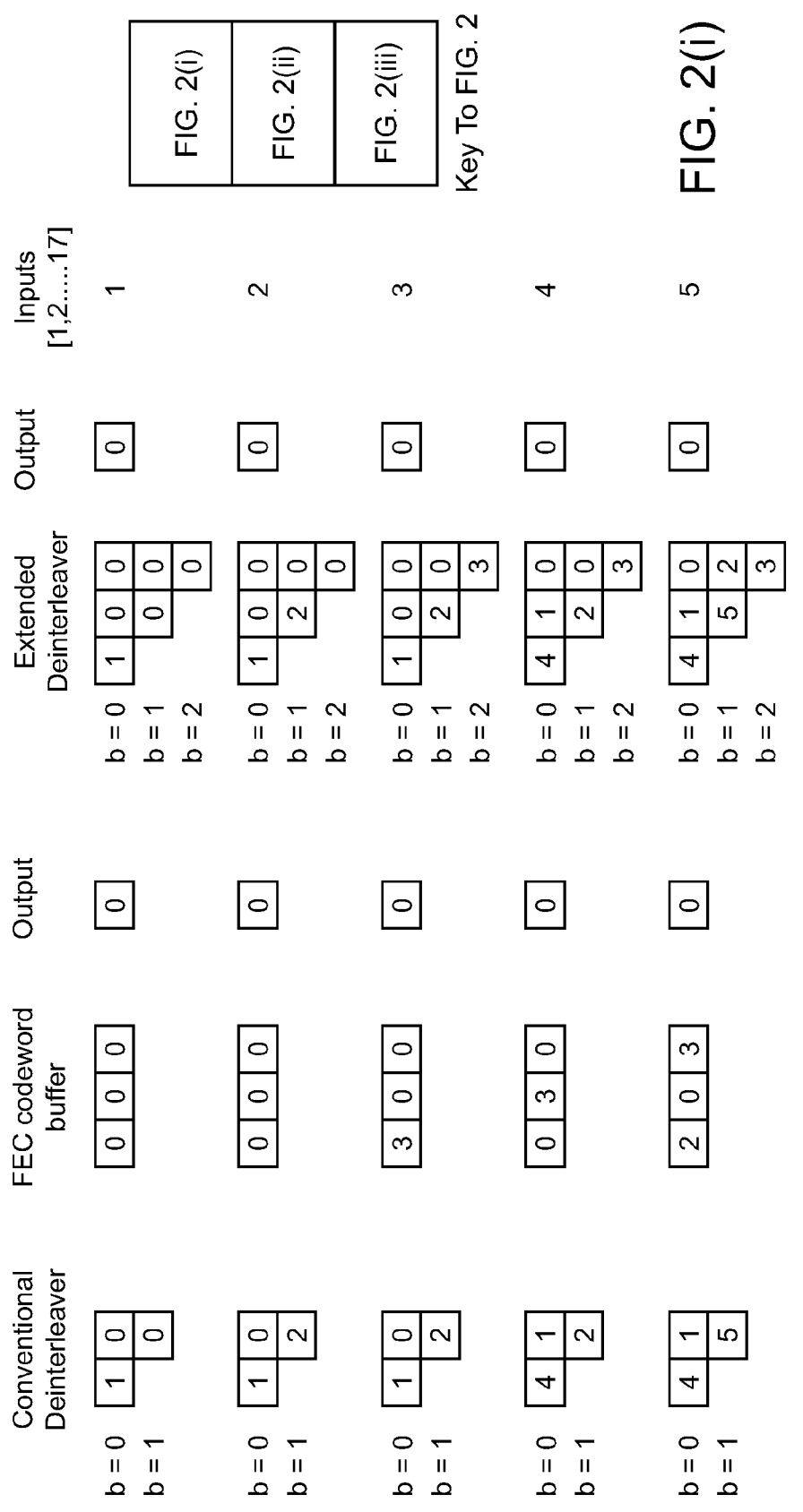
Figure 2II:
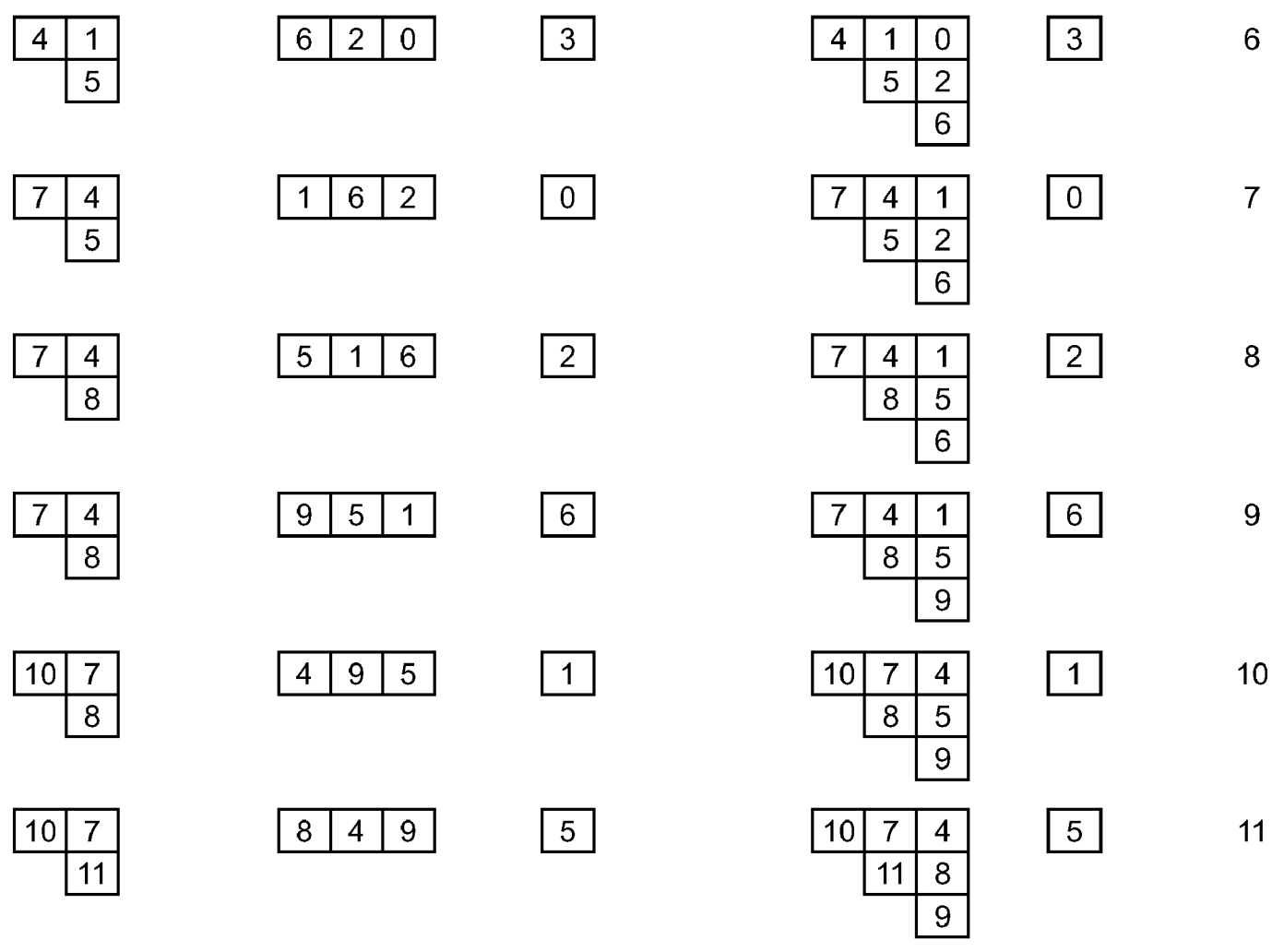
Figure 2III:
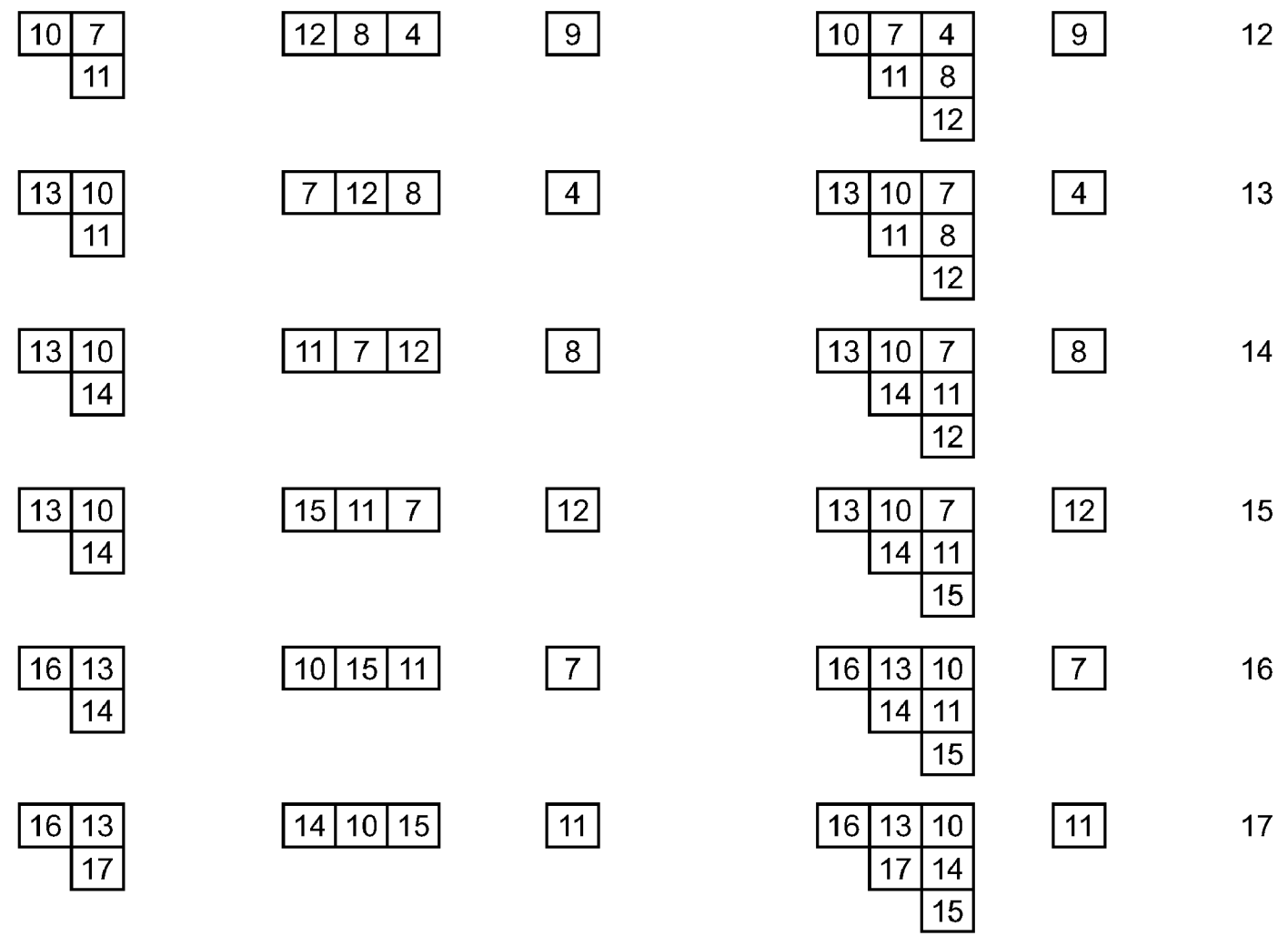

FIG. 2(*i*)-FIG. 2(*iii*) show an example of the contents of the deinterleaver and codeword buffer for both a conventional deinterleaver and an extended deinterleaver. In FIG. 2(*i*)-2(*iii*), the contents of the deinterleaver and codeword buffer are shown for the range of inputs of the sequence 1, 2, . . . 19. Thus, there are 19 entries in FIG. 2(*i*)-FIG. 2(*iii*). The conventional deinterleaver includes a separate FEC codeword buffer, whereas the extended deinterleaver does not, because buffering is done within the extended deinterleaver itself. Both the conventional deinterleaver and the extended deinterleaver make use of a Forney type deinterleaver design, wherein B=3 storage branches of M=1 element each. The storage branches B in FIG. 2(*i*)-FIG. 2(*iii*) are represented by each row of squares. M is equal to 1 element, and accordingly each square holds one element. M is related to the difference in the number of elements between each storage branch. In FIG. 2(*i*)-FIG. 2(*iii*), the length of each appended storage branch is $L_b$=(B-1-b)*M, so accordingly each appended storage branch b is M elements shorter than appended storage branch b-1.

The contents of the conventional deinterleaver and FEC codeword buffer as well as the extended deinterleaver will now be discussed in the context of input 1 for illustrative purposes. The conventional deinterleaver contains two rows. The first row of the conventional deinterleaver represents the first storage branch (b=0) and contains two squares. The second storage branch (b=1) is represented by the single square in the bottom, or second, row. Since the length of the third storage branch (b=2) is zero, there is no square to represent it. In the extended deinterleaver each appended storage branch is extended by 1 square. So the first appended storage branch (b=0) has three squares, appended storage branch (b=1) has two squares, and appended storage branch (b=2) has one square.

In FIG. 2(*i*)-FIG. 2(*iii*) the inputs arrive at the deinterleavers in order from 1 to 19. An input commutator cycles through each branch of the deinterleaver. Thus, input 1 goes to the first storage branch, input 2 goes to the second storage branch, and input 3 goes to the third storage branch. The process is then continuously repeated such that input 4 goes to the first storage branch, input 5 goes to the second storage branch, and input 6 goes to the third storage branch, and so forth. When an input goes to a deinterleaver storage branch of the FEC codeword buffer, it pushes the existing contents to the right.

In the conventional deinterleaver, the contents of the far right square in the FEC codeword buffer becomes the next output. In the extended deinterleaver of the various embodiments of the present invention, the output commutator selects the contents of each far right square of each appended storage branch in succession to form the outputs. For example, when the input goes to appended storage branch 0, the output is the previous contents of the far right square in appended storage branch 0. In the conventional deinterleaver, the last element in the storage branch (the far right square) goes out of the deinterleaver and into the FEC codeword buffer. The FEC decoder can read any elements that are available in the FEC codeword buffer. In the extended deinterleaver, the FEC decoder gets elements directly from the extended deinterleaver. The N number of extra elements (or squares in FIG. 2(*i*)-FIG. 2(*iii*)) added to the end of each appended storage branch of the extended deinterleaver provide buffering for the FEC codewords. The effect is equivalent to adding a FIFO type buffer between the deinterleaver and the FEC decoder, in that the order of output elements is the same. But the number of overall read/write operations is reduced compared to the conventional design of a deinterleaver and separate FIFO buffer.

Figure 3:
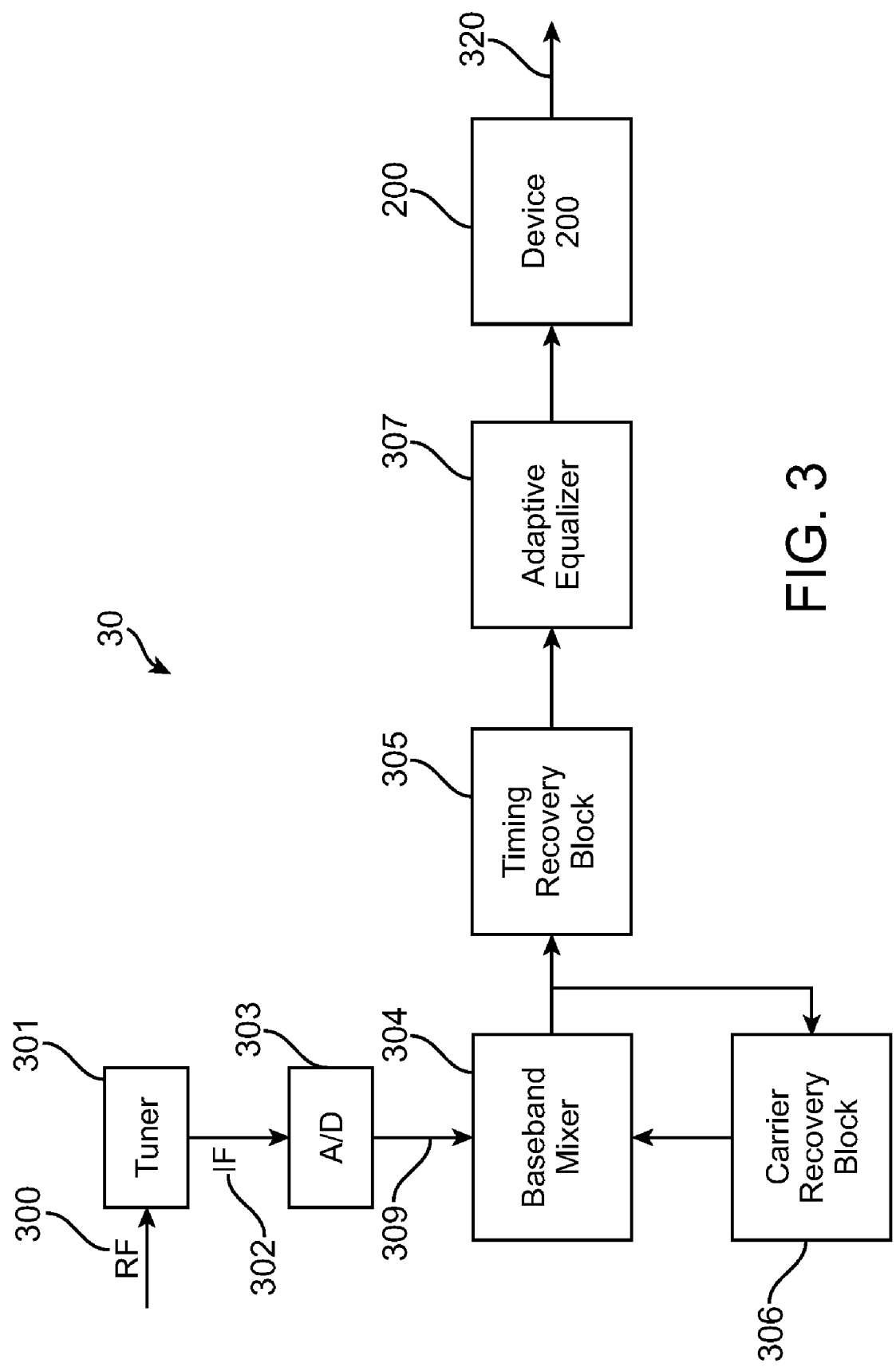
FIG. 3 shows extended deinterleaver-decoder 200 within a signal processing circuit 30.

FIG. 3 shows extended deinterleaver-decoder 200 coupled to a signal processing circuit 30. Signal processing circuit 30 is shown to include tuner 301, intermediate frequency (IF) signal 302, analog-to digital (A/D) converter 303, baseband mixer 304, carrier recovery block 306, timing recovery block 305, and adaptive equalizer 307. The tuner receives radio frequency (RF) input 300 and provides an (IF) signal 302 to the A/D converter 303, to which it is coupled. A/D converter 303 is coupled to both the tuner 301 and the baseband mixer 304. The A/D converter 303 samples the IF signal 302 at a rate not synchronized to a remote transmitter to produce digital IF signal 309. The digital IF signal 309 is then passed to the baseband mixer 304. The baseband mixer 304 down-converts the digital IF signal 309 to baseband and passes the down-converted baseband signal to the timing recovery block 305, to which it is coupled. The baseband mixer 304 is coupled to the A/D converter 303, the timing recovery block 305, and the carrier recovery block 306. The carrier recovery block 306 is coupled to the baseband mixer 304 and the timing recovery block 305. The carrier recovery block 306 serves to synchronize the baseband mixer to the IF carrier frequency. The timing recovery block 305 is coupled to the baseband mixer 304 and the equalizer 307, and serves to resample the down-converted baseband signal at a rate synchronized to the remote transmitter. The timing recovery block 305 automatically updates its re-sampling rate to maintain synchronization with the remote transmitter (not shown). The adaptive equalizer 307 is coupled to the timing recovery block 305 and performs the processing step before the signal is received by extended deinterleaver-decoder 200. The adaptive equalizer 307 removes multi-path distortion and other forms of inter-symbol interference (ISI) from the signal. Extended deinterleaver-decoder 200 is operative to generate output 320. Output signal 320 represents the information signal to be decoded. In some embodiments, the output signal 320 is further processed by other error correction, error detection, de-scrambling, or de-randomizing blocks.

U.S. patent application Ser. No. 11/650,226, filed on Jan. 5, 2007 and entitled "DYNAMIC MULTI-PATH DETECTION DEVICE AND METHOD" by Dong et al., the disclosure of which is herein incorporated by reference as though set forth in full, provides further details of the signal processing circuit 30.

In an alternative embodiment of signal processing circuit 30, the A/D sampling rate is synchronized to the remote transmitter. This embodiment eliminates the need for timing recovery block 305. Further alternative embodiments include an Automatic Gain Control (AGC), digital filters, and various synchronization circuits. In alternative embodiments, different communication systems and different signal processing configurations are contemplated. While an embodiment of signal processing circuit 30 has been disclosed herein, it is appreciated that other embodiments are contemplated by those skilled in the art. It is noted that while circuit 30 is described as being performed in hardware, it is known to one skilled in the art that the operations performed by circuit 30 may also be performed in software.

The hardware described above, including any logic or transistor circuit, may be generated automatically by computer based on a description of the hardware expressed in the syntax and the semantics of a hardware description language, as known by those skilled in the art. Applicable hardware description languages include those provided at the layout, circuit netlist, register transfer, and schematic capture levels. Examples of hardware description languages include GDS II and OASIS (layout level), various SPICE languages and IBIS (circuit netlist level), Verilog and VHDL (register transfer level) and Virtuoso custom design language and Design Architecture-IC custom design language (schematic capture level). The hardware description may also be used, for example, in various behavior, logic and circuit modeling and simulation purposes.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An extended deinterleaver employed for use with a variable iteration decoder, the extended deinterleaver being responsive to at least one input signal, comprised of codewords, and operative to generate a deinterleaved output signal, the extended deinterleaver comprising:
    a storage space organized into B number of appended storage branches, at least one appended storage branch having a storage branch and at least one element N, the received codewords being deinterleaved and buffered by the extended deinterleaver prior to being provided to the variable iteration decoder, wherein at least one or more of the elements of each branch are output in a first in first out manner, and each appended storage branch further having a length that is extended by the length of N,
    wherein the length N is M*F/B elements, with F representing the length of the codeword in elements, M representing the total number of extra codewords that are operable to be buffered in the extended deinterleaver, M being a positive integer, N being appended to each of the B storage branches in the extended deinterleaver, and
    wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N.

2. An extended deinterleaver, as recited in claim 1, wherein a peak number of iterations is defined by $I_{peak}=(M+1)*I_{avg}$, with $I_{peak}$ representing a peak number of iterations and $I_{avg}$ representing the average number of iterations available per codeword, and $I_{avg}$ is determined by dividing the time it takes to receive one codeword by the time it takes to perform one decoder iteration, such that M codewords may be buffered while the preceding codeword is decoded.

3. An extended deinterleaver, as recited in claim 1, further comprising:
    an input commutator, responsive to the input signal and operative to store the input signal in one of the B number of appended storage branches; and
    an output commutator, responsive to the stored input signal, the stored input signal being representative of the input signal delayed by an amount of time determined by the length of the storage branch, the output commutator being operative to generate the deinterleaved output signal.

4. An extended deinterleaver, as recited in claim 1, further comprising:
    an input logic, responsive to the input signal and operative to store the input signal in one of the B number of appended storage branches; and
    an output logic, responsive to the stored input signal, the stored input signal being representative of the input signal delayed by an amount determined by the length of the storage branch, the output logic operative to generate the deinterleaved output signal; wherein the storage of the B number of appended storage branches is implemented by random access memory (RAM).

5. An extended deinterleaver, as recited in claim 3, wherein the elements of the B number of appended storage branches are addressed in the same order as if they were in first-in-first-out FIFO buffers.

6. An extended deinterleaver, as recited in claim 1, wherein the extended deinterleaver is operative to provide an output metric indicative of currently-available storage spaces in the appended storage branches to serve as a buffer.

7. An extended deinterleaver, as recited in claim 6, wherein the output metric is a count of elements or codewords representing empty locations in the appended storage branches.

8. An extended deinterleaver, as recited in claim 3, wherein the extended deinterleaver uses convolutional deinterleaving, and the B number of branches have different lengths.

9. An extended deinterleaver employed for use with a variable iteration decoder, the extended deinterleaver being responsive to at least one input signal, comprised of codewords, and operative to generate a deinterleaved output signal, the extended deinterleaver comprising:
    a storage space organized into B number of appended storage branches, at least one appended storage branch having a storage branch and at least one element N, the received codewords being deinterleaved and buffered by the extended deinterleaver prior to being provided to the variable iteration decoder, wherein at least one or more of the elements of each branch are output in a first in first out manner, and each appended storage branch further having a length that is extended by the length of N, N being at least one element,
    an input commutator, responsive to the input signal and operative to store the input signal in one of the B number of appended storage branches; and
    an output commutator, responsive to the stored input signal, the stored input signal being representative of the input signal delayed by an amount of time determined by the length of the storage branch, the output commutator being operative to generate the deinterleaved output signal,
    wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N, and
    wherein the extended deinterleaver uses a block interleaving scheme and each of the B number of appended storage branches are equal in length, and further wherein the input commutator advances once per element when an input is received from a signal processing circuit, the signal processing circuit operative to send the input signal, and the output commutator advances once per group of elements when an output is taken by a variable iteration decoder, the variable iteration decoder receptive to the output of the extended deinterleaver and operative to generate the information signal to be decoded.

10. An extended deinterleaver-decoder, responsive to at least one input signal, comprised of codewords, and operative to generate an information signal, comprising:

a storage space organized into B number of appended storage branches, at least one appended storage branch having at least two parts, the storage space being configured to store received codewords, the received codewords being deinterleaved and buffered by the extended deinterleaver prior to being provided to the variable iteration decoder, wherein at least one or more of the elements of each branch are output in a first in first out manner, and each appended storage branch further having a length that is extended by the length of N, wherein the length N is M*F/B elements, with F representing the length of the codeword in elements, M representing the total number of extra codewords that are operable to be buffered in the extended deinterleaver, M being a positive integer, N being appended to each of the B storage branches in the extended deinterleaver, and wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N; and a variable iteration decoder, responsive to a deinterleaved output signal and operative to generate an information signal, the information signal representing a fully decoded input signal.

11. An extended deinterleaver-decoder, as recited in claim 10, wherein the variable iteration decoder is a Forward Error Correction (FEC) decoder which uses turbo codes.

12. An extended deinterleaver-decoder, as recited in claim 10, wherein the variable iteration decoder is a Forward Error Correction (FEC) decoder which uses low-density parity-check (LDPC) codes.

13. An extended deinterleaver-decoder, as recited in claim 10, wherein the variable iteration decoder further includes an operation to convert data symbols into one or more bit soft metrics.

14. An extended deinterleaver comprising:

means for receiving at least one input signal, wherein the input signal is comprised of codewords;

means for storing the input signal in a storage space organized into B number of appended storage branches, at least one appended storage branch having a storage branch and at least one element N, and each appended storage branch further having a length that is extended by the length of N, wherein the length N is M*F/B elements, with F representing the length of the codeword in elements, M representing the total number of extra codewords that are operable to be buffered in the extended deinterleaver, M being a positive integer, N being appended to each of the B storage branches in the extended deinterleaver, wherein each appended storage branch, indexed by 'b', has a length of $L_b+N$, wherein $L_b$ is the length of the storage branch prior to appending N; and means for generating a deinterleaved output signal wherein the received codewords are deinterleaved and buffered by the extended deinterleaver prior to being provided to a variable iteration decoder, wherein at least one or more of the elements of each branch are output in a first in first out manner.

15. A method of deinterleaving an input signal comprising:
a. receiving at least one input signal, wherein the input signal is comprised of codewords;
b. storing the input signal in a storage space organized into B number of appended storage branches, at least one appended storage branch having a storage branch and at least one element N, and each appended storage branch further having a length that is extended by the length of N, wherein the length N is M*F/B elements, with F representing the length of a codeword in elements, M representing the total number of extra codewords that are operable to be buffered in an extended deinterleaver, M being a positive integer, N being appended to each of the B storage branches in the extended deinterleaver;
c. buffering the input signal, wherein each appended storage branch, indexed by 'b', has a length of $L_b+N$, wherein $L_b$ is the length of the storage branch prior to appending N;
d. generating a deinterleaved output signal wherein the received codewords are deinterleaved and buffered by the extended deinterleaver prior to being provided to a variable iteration decoder, wherein at least one or more of the elements of each branch are output in a first in first out manner.

16. A non-transitory computer-readable medium containing a description expressed in a hardware description language which is interpreted by a computer to specify a circuit that performs a method to generate a deinterleaved output signal from at least one input signal, comprised of codewords, comprising:

a storage space organized into B number of appended storage branches, at least one appended storage branch having at least two parts, the storage space being configured to store received codewords, the received codewords being deinterleaved and buffered by an extended deinterleaver prior to being provided to a variable iteration decoder, wherein at least one or more of the elements of each branch are output in a first in first out manner, and each appended storage branch further having a length that is extended by the length of N, wherein the length N is M*F/B elements, with F representing the length of a codeword in elements, M representing the total number of extra codewords that are operable to be buffered in the extended deinterleaver, M being a positive integer, N being appended to each of the B storage branches in the extended deinterleaver, and wherein as a codeword is provided to the variable iteration decoder, other codewords are provided to subsequent appended storage branches, and further wherein each appended storage branch, indexed by 'b', has a length of $L_b+N$, wherein $L_b$ is the length of the storage branch prior to appending N.

* * * * *